United States Patent [19]

Ohshita et al.

[11] 4,321,189

[45] Mar. 23, 1982

[54] FLAME RETARDANT POLYAMIDE MOLDING RESIN CONTAINING MELAMINE CYANURATE FINELY DISPERSED THEREIN

[75] Inventors: Hiroshi Ohshita; Tadao Tsutsumi, both of Nagoya, Japan

[73] Assignee: Toray Industries, Inc., Tokyo, Japan

[21] Appl. No.: 138,690

[22] Filed: Apr. 9, 1980

[30] Foreign Application Priority Data

Apr. 12, 1979 [JP] Japan .................................. 54-44616
Apr. 12, 1979 [JP] Japan .................................. 54-44617
Apr. 12, 1979 [JP] Japan .................................. 54-44618
Dec. 28, 1979 [JP] Japan .................................. 54-170338

[51] Int. Cl.³ ............................................. C08K 5/34
[52] U.S. Cl. ..................................... 524/101; 252/609

[58] Field of Search ................ 260/45.8 NT; 528/314, 528/336

[56] References Cited

U.S. PATENT DOCUMENTS 4,001,177 1/1977 Tsutsumi et al. ............ 260/45.8 NT
4,180,496 12/1979 Yanagimoto et al. ...... 260/45.8 NT

*Primary Examiner*—Harold D. Anderson
*Attorney, Agent, or Firm*—Austin R. Miller

[57] ABSTRACT

A flame retardant polyamide molding resin containing melamine cyanurate is formed from melamine and cyanuric acid in the molten polyamide and has a fine crystallite size of less than 250 Å. The polyamide molding resin provides shaped articles having excellent mechanical properties as well as flame retarding properties without blooming.

8 Claims, 4 Drawing Figures

FLAME RETARDANT POLYAMIDE MOLDING RESIN CONTAINING MELAMINE CYANURATE FINELY DISPERSED THEREIN

BACKGROUND OF THE INVENTION

1. Field of the Invention

The present invention relates to a flame retardant polyamide molding resin and to a process for preparing the same. More specifically the present invention relates to a polyamide molding resin having excellent mechanical properties and molding processability as well as flame retarding properties.

2 Description of the Prior Art

Polyamide molding resins are used in a wide range of applications, because of their excellent mechanical strength. However it has been recently required to give them a high level of flame retardancy especially for electric or electronic use, and various kinds of flame retarding agents have been proposed.

Melamine-cyanurate, one of those flame retarding agents for polyamides, is very excellent, so far as the so-called blooming phenomenon is concerned (Japanese Patent Publication Kokai No. 53-31759) That is, melamine cyanurate blended with a polyamide does not bleed out on the surface of the molded article prepared therefrom because of its limited tendency to sublime.

Melamine cyanurate, however, has some disadvantages for use as a flame retarding agent. One disadvantage is the relatively great difficulty in dispersing it in polyamides. A uniform dispersion of the flame retarding agent in the matrix resin is highly desirable for imparting to the resin an excellent flame retarding property. At the same time a non-uniform dispersion of melamine cyanurate downgrades the mechanical properties of the entire molding resin.

Another disadvantage of melamine cyanurate is its high cost in comparison with melamine or cyanuric acid. Melamine cyanurate is usually prepared by reacting an equimolar amount of melamine and cyanuric acid in large amounts of water at a temperature of 80° to 90° C. The precipitate of melamine cyanurate thus obtained should be separated from the water by filtration, dried and crushed to a fine powder. Such a troublesome process naturally results in high cost of the melamine cyanurate.

SUMMARY OF THE INVENTION

It is an object of the present invention to provide improved polyamide molding resins containing melamine cyanurate as a flame retarding agent and having excellent mechanical properties as well as excellent flame retarding characteristics.

Another object of the present invention is to provide a cost saving process for preparing the improved flame retarding polyamide molding resin directly from melamine, cyanuric acid and a polyamide.

Still other objects of the present invention will be apparent from the description in the accompanying specification.

We now have found that melamine cyanurate can be formed in molten polyamide resins from melamine and cyanuric acid at a conversion of substantially 100%. Melamine cyanurate thus prepared has an extraordinarily fine crystallite size which can be determined by x-ray diffraction analysis, and also has fairly excellent dispersion, properties in the polyamide.

The present invention provides a flame retarding polyamide molding resin which comprises a polyamide and melamine cyanurate finely dispersed in the polyamide matrix, said melamine cyanurate being formed from an equimolar amount of melamine and cyanuric acid in the molten polyamide at a conversion of substantially 100%, and said melamine cyanurate having an average crystallite size (L) of less than 250 Å, calculated by following formula, $$L = \frac{\kappa \cdot \lambda}{\beta_o \cdot \cos \theta}$$

wherein,

L = average crystalline size of melamine cyanurate measured along the direction perpendicular to the lattice planes whose spacing is 3.17 Å, $\theta$ = diffraction angle of the lattice planes whose spacing is 3.17 Å, $\beta_o$ = half width of the diffraction peak corresponding to the lattice planes whose spacing is 3.17 Å (unit; radian), $\kappa$ = constant (1.0)

$\lambda$ = wavelength of the employed x-ray (Å).

DETAILED DESCRIPTION OF THE PREFERRED EMBODIMENTS

Figure 1:
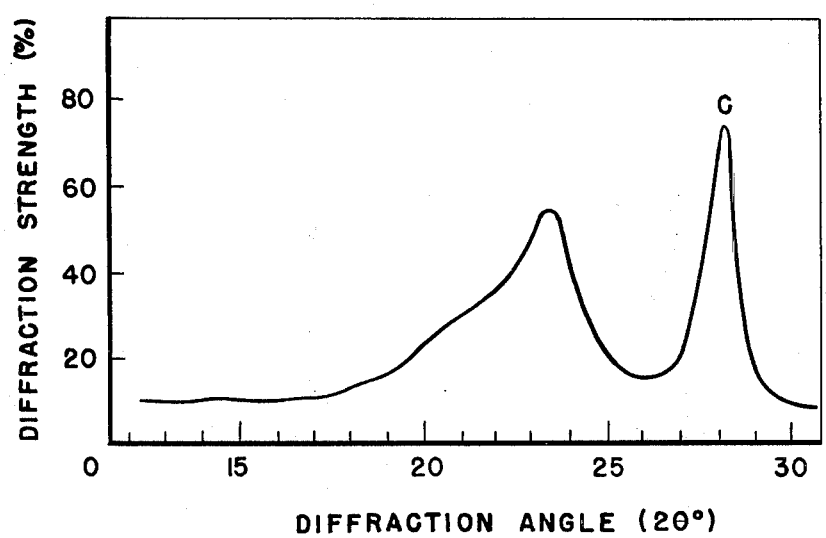

Melamine cyanurate formed in molten polyamide from melamine and cyanuric acid has a remarkably small crystallite size and an extraordinarily excellent dispersion in polyamide.

The crystallite size L can be less than 250 Å, preferably less than 200 Å. The crystallite size L is calculated by the following formula (Scherrer's equation), $$L = \frac{\kappa \cdot \lambda}{\beta_o \cdot \cos \theta}$$

wherein L, $\beta_o$, $\theta$, $\kappa$ and $\lambda$ means the same as explained above, and can be measured by the method mentioned below.

The intensity of the x-ray reflected by the test piece of the polyamide molding resin to diffraction angle (2$\theta$) is measured continuously by x-ray diffractometer, and the half width ($\beta_o$) of the diffraction peak corresponding to the lattice spacing of 3.17 Å is evaluated. Then the crystallite size (L) is calculated from the above Scherrer's equation. The conditions of above mentioned measurement are as follows:

test specimens; injection molded plate having a thickness of 1/16",
x-ray source: Cu, K$_\alpha$, wavelength ($\lambda$) = 1.542 Å,
x-ray tube voltage: 35 kV
x-ray tube current: 15 mA
slit system:
    divergence slit ½°,
    receiving slit 0.3 mm,
    scattering slit ½°

In the conditions as mentioned above, the diffraction peak corresponding to the lattice spacing 3.17 Å appears at 2$\theta$ = 28.15°.

REFERRING TO THE DRAWINGS

Figure 3:
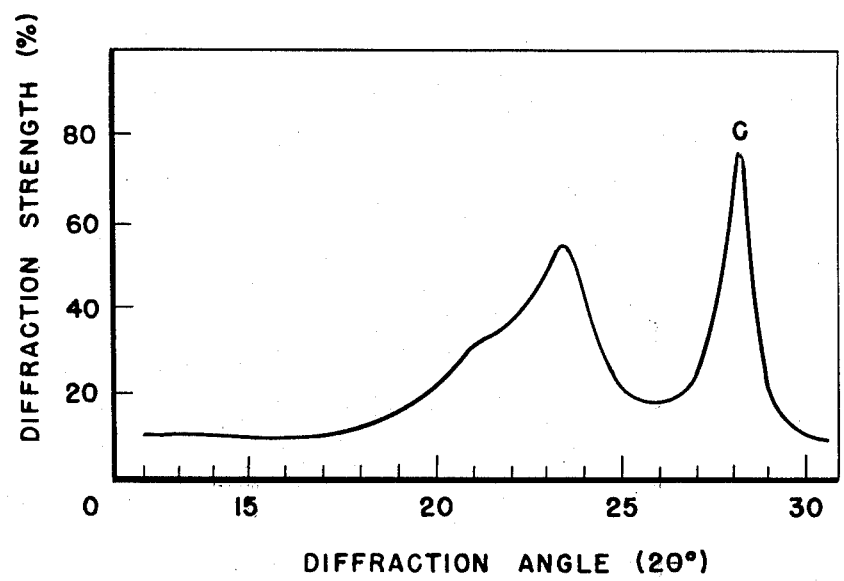

FIGS. 1 and 3 are x-ray diffraction spectra of the polyamide molding resin. The peak C at 2$\theta$ = 28.15 Å shows that melamine cyanurate is formed from melamine and cyanuric acid. No peaks suggesting the existence of the remaining melamine and cyanuric acid are observed.

Figure 2:
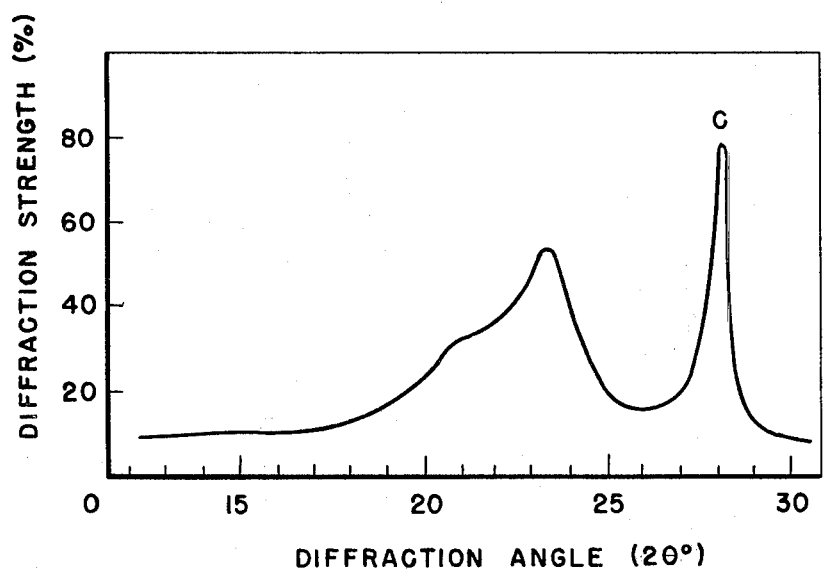

FIG. 2 is an X-ray diffraction spectrum of a polyamide molding resin prepared by melt-blending nylon 6 and melamine cyanurate previously prepared in a conventional method and commercially available. The peak at $2\theta = 28.15$ Å is far sharper than that in FIGS. 1 and 3. This fact teaches that the melamine cyanurate formed in the molten polyamide has a considerably smaller crystallite size than the ordinary melamine cyanurate.

The commercially available melamine cyanurate is usually prepared from melamine and cyanuric acid in a large amount of water, and has a larger crystallite size, usually more than 300 Å.

As mentioned above, it is not easy to bring about a uniform dispersion of the same in polyamide.

Figure 4:
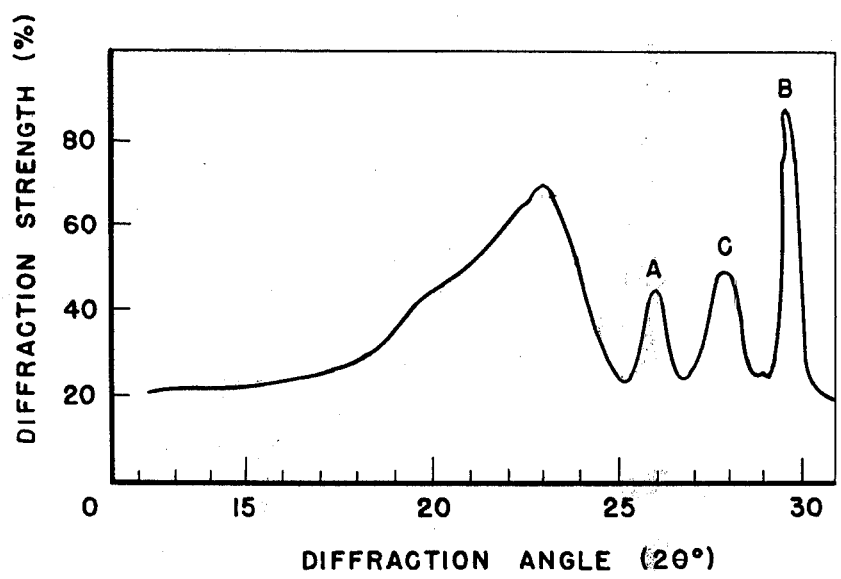

FIG. 4 is an x-ray diffraction spectrum of a polyamide molding resin prepared by melt-blending in the extruder a dry blend of melamine, cyanuric acid and polyamide pellets. The peaks A and C correspond to the characteristic diffraction angle of melamine and cyanuric acid crystals respectively. In this case the complex formation (melamine cyanurate is a charge-transfer type complex of melamine and cyanuric acid.) is not complete and a substantial amount of melamine and cyanuric acid remains in the polyamide molding resin.

The amount of melamine cyanurate contained in the polyamide molding resin of the present invention may be in the range of 1 to 30%, preferably 3 to 15% by weight based on the polyamide. But the amount may be determined according to the desired level of the flame retarding properties to be imparted to the polyamide molding resin. An excessive amount of melamine cyanurate tends to downgrade the mechanical properties of the polyamide molding resin. For this reason the use of more than 30% by weight of melamine cyanurate is not prefereble.

The polyamide molding resin of the present invention has a characteristic in that a relatively small amount of melamine cyanurate can impart a higher level of flame retardancy to the polyamide resin in comparison with the use of melamine cyanurate previously prepared and having a larger crystallite size. For example, by using approximately 5% by weight of melamine cyanurate the polyamide molding resin can achieve a flame-retardancy of V-0 under UL-94 according to the present invention.

Melamine cyanurate contained in the flame retarding polyamide molding resin of the present invention is formed from melamine and cyanuric acid in the molten polyamide. The conversion in the complex formation should be substantially complete. At the same time the amount of melamine and cyanuric acid added to the polyamide should be substantially equimolar. When a substantial amount of either melamine or cyanuric acid remains unreacted in the polyamide molding resin, blooming tends to take place on the surface of the shaped articles prepared thereform.

For example, in one of the most usual blending methods, wherein a dry blend of equimolar amounts of pulverized melamine and cyanuric acid with the dry pellets of polyamide is fed to the extruder and thoroughly melt-blended therein, the conversion of the complex forming reaction can not be expected to reach a level of as high as 100%.

Preferable methods to attain the substantially complete conversion to melamine cyanurate may be as follows.

(1) In the first method melamine and cyanuric acid are separately blended with molten polyamide, and then both polyamide blends are further melt-blended with each other in such an amount that the melamine and cyanuric acid become equimolar in the ultimate blend. In this case melt-blending means a blending at a temperature high enough to maintain the polyamide in a molten state. Melamine and cyanuric acid are usually blended in the solid state. Both polyamides, containing melamine and cyanuric acid respectively, may be once formed into pellets, and these two different pellets may be again melt-blended in a repelletizing extruder or other molding extruder such as an injection molder. In other embodiments both streams of molten polyamide containing melamine and cyanuric acid respectively may directly be mixed through a static mixing apparatus for fluids.

The temperature at which the above melt-blending is carried out may be 5° to 80° C. higher than the melting point of polyamide.

(2) In the alternative method a polyamide composition containing either one component of melamine or cyanuric acid is previously prepared by a conventional melt-blending method. To this polyamide composition another component selected from melamine and cyanuric acid is added and thoroughly melt-blended. At this time the amount of melamine and cyanuric acid should be adjusted so as to become equimolar, in order to attain a conversion as high as possible. Of course, the order of adding melamine and cyanuric acid is not restricted.

The previously prepared polyamide composition may be once pelletized and then again blended with another component. In other embodiments, the second component may be added to the melt of the previously prepared blend without once forming the same in to pellets. In the latter embodiments, the extruder installed with two feed inlets can be advantageously used.

In this method, the melt-blending of polyamide with both components of melamine and cyanuric acid is carried out at a temperature of 5° to 80° C. higher than the melting point of the polyamide.

The master pellet method can be adapted to this embodiment. Thus the master pellet containing a high content of either melamine or cyanuric acid may be blended with another component selected from melamine and cyanuric acid together with virgin pellets of polyamide.

(3) In the third method polyamide is melt-blended with melamine and cyanuric acid in the presence of water. The amount of water may be 1 to 30%, preferably 3 to 20%, by weight based on polyamide, and more preferably approximately equivalent to the total amount of melamine and cyanuric acid. When less than 1% by weight of water is used, the enchancement of conversion of the complex formation is not large enough to minimize the blooming phenomenon. When more than 30% by weight of water is used, water causes foaming in the molten polyamide during the melt-blending operation, and therefore it becomes impossible to operate the melt-blending procedure steadily.

In this method the manner of adding melamine and cyanuric acid to polyamide is not restricted. They can be previously mixed with each other and the mixture may be added to the polyamide together with water. Of course the separate addition method as adopted in above mentioned methods (1) and (2) can be employed in this case. The melt-blending methods are not restricted. Various conventional ones which can attain the uniform blending of melamine and cyanuric acid in polyamide may be employed.

The proper amount of water may be added to the blends comprising dry pellets of polyamide, melamine and cyanuric acid. The wet pellets of polyamide, which are easily available from the oligomer extraction process and contain about 10% by weight of water, may be advantageously used in this embodiments.

The extruder used in this method may preferably be installed with the vent, from which steam originated in the melt blending operation can be removed.

The reason why the existence of water accelerates the formation of melamine cyanurate, has not been known. But it can be reasonably assumed that the existence of water in the melt-blends improve the solubility of melamine and cyanuric acid in the polyamide.

In this method no specific melt-blending condition is required. The melt-blending temperature may be 5° to 80° C. higher than the melting point of the polyamide.

The polyamide resins of the present invention may be any conventional thermoplastic polyamide resins. For example, the polyamide resins can be obtained by polymerizing lactams or aminocarboxylic acids having three or more carbon atoms. Alternatively, the polyamide resins can be obtained by polycondensation of diamines and dicarboxylic acids or derivatives thereof. That is, the polyamide resins include homopolymers and copolymers of polyamides and mixtures thereof. Examples of the polyamide resins are homo-polyamides such as nylon 6, nylon 66, nylon 4, nylon 8, nylon 11, nylon 12, nylon 69, nylon 610 and nylon 612 and co-polyamides such as nylon 6/66, nylon 6/12 and nylon 6/69.

Melamine used in preparing the polyamide molding resin of the present invention is not specifically restricted. The melamine powder commercially available for the production of melamine-formaldehyde resin may be used. The melamine powder may be purified by recrystallization from water or may be further finely pulverized. More preferably melamine powder having an average diameter of less than 50 μ are used. Melamine may contain a melamine derivative such as acetoguanamine, ethylmelamine, benzo-guanamine and anmelin within an range of the amount to retain the advantages of the present invention.

Cyanuric acid used in preparing the polyamide molding resin of the present invention may preferably have an average diameter of less than 50μ. The term "cyanuric acid" means both cyanuric and isocyanuric acid inclusively.

The polyamide molding resin of the present invention may contain dyes, pigments, fillers, fibrous reinforcing fillers, heat-resisting agents, weather-proofing agents, plasticizers, lubricants, mold-release agents, nucleating agents and anti-static agents. Particularly, in order to increase the heat resistance of the composition of the present invention, copper-containing compounds which are effective for heat-stabilizing ordinary polyamide resins, for example, inorganic salts such as copper iodide and copper sulfate and organic acid salts such as copper acetate and copper stearate may be used. The copper compounds mentioned above may be used together with an alkali metal or an alkaline earth metal. Hindered phenols and phosphite compounds may also be used as heat stabilizing agents. As mold-release agents, higher fatty acids or its derivatives such as esters, amides and metal salts, paraffins and silicone oils may be used. As nucleating agents, talc, zeolite, clay and alumina etc, may be used. The anti-static agents may be polyalkyleneglycol, sodium dodecylbenzensulfonate and so on.

The present invention will be illustrated in more detail by the following examples.

In these examples, the combustion test was carried out by measuring a combustion test piece of 5"×½"×1/16" by Standard UL-94 (Underwriters Laboratories Inc. of U.S.A.) in the vertical combustion.

Tensile strength and the Izod impact strength were measured by the methods of ASTM-D-638 and D-256 respectively.

The blooming was tested as follows. To 100 parts by weight of the pellets of the polyamide molding resin, 5 parts by weight of black master pellets M 100 B-1 produced by Toray Ind. Inc. are added and dry-blended. The blends are molded to the test pieces for UL-94 combustion test. The test pieces are maintained at 40° C. in 95% RH for seven days, and thereafter are checked by observing whether or not any white blooming material deposits on the surface.

EXAMPLE 1

95 parts by weight of nylon 6 having a relative viscosity ($\eta_r$) of 2.40, which is determined in a solution of 1 g of the resin in 100 ml of 98% sulfuric acid at 25° C., and 5 parts by a weight of melamine were uniformly mixed by Henschell mixer. The mixture was fed into an extruder, having an inside diameter of 30 m/m, melted and kneaded at a temperature of 250° C. The molten mixture was extruded to form a strand, and then cut into pellets. In a similar way as described above using cyanuric acid instead of melamine, nylon 6 pellets containing 5% of cyanuric acid were prepared. (Then these two kinds of pellets were dried for 16 hours at a temperature of 80° C. by vacuum dryer.)

50 parts each of two kinds of pellets obtained above were dry-blended and fed into an extruder having a inside diameter of 30 m/m. The blend was melted and kneaded at a temperature of 250° C., extruded into a form of strand, and cut to a form of pellets (A) containing 5% by weight of melamine cyanurate. Then, pellets (A) were molded into UL flame test specimens at a thickness of 1/16 inch, tensile and impact test specimens by a 3.5 oz. injection molding machine.

For the comparative test, 95 parts by weight of nylon 6, having a relative viscosity 2.40 and 5 parts by weight of melamine cyanurate, which was uniformly mixed by Henschell mixer, were fed into an extruder of 30 m/m, melted and kneaded at a temperature of 250° C. The molten blend was extruded in the form of a strand and cut to pellets (B) containing 5% by weight of melamine cyanurate. The pellets (B) were molded to test specimens in the same way described above.

The 1/16 UL test specimens obtained from pellets of (A) and (B) were subjected to x-ray diffraction analysis. FIGS. 1 and 2 are the x-ray diffration charts of test specimens prepared from the pellets (A) and (B), respectively, and clearly show that pellets (A) contain melamine cyanurate. Furthermore from L (Å) in Table 1, it can be easily understood that melamine cyanurate formed in molten polyamide has a smaller crystalline particle size than that of commercially available melamine cyanurate.

The crystalline size L was measured by a previously described method of x-ray diffraction analysis.

Then, each specimen was subjected to UL-94 flammability tests and JIS K-6810 tensile, impact tests. The evaluation of flammability was conducted, using 5 specimens each for the sample, including the disorder of flammability behaviour. The number cited in the column of evaluation of flame test in Table 1 shows the flaming time in seconds and the mark inside the ( ) represents whether the cotton below the test specimen is ignited or not. o shows no ignition of cotton, and x ignition of cotton.

These test results are summarized in Table 1.

From the results of Table 1, it is clearly understood that the polyamide molding resins of the present invention, in which melamine cyanurate having a smaller crystalline particle size is dispersed, have improved flame retarding properties and exhibits excellent mechanical properties.

TABLE 1

| Specimen | L (Å) | Evaluation of Flammability | | | | | Tensile Strength (kg/cm$^2$) | Notched Izod Impact Strength (kg cm/cm) |
|---|---|---|---|---|---|---|---|---|
| A (Example 1) | 142 | 0 (o) | 0 (o) | 0 (o) | 0 (o) | 0 (o) | 820 | 4.5 |
| B (Comparative test) | 550 | 1 (x) | 0 (o) | 5 (x) | 2 (o) | 0 (o) | 700 | 3.0 |

EXAMPLE 2

100 parts by weight of nylon 6, having a relative viscosity of 2.35 and 10 parts by weight of melamine were uniformly mixed by a Henschell mixer, and then fed into an extruder, having a diameter of 30 m/m, melted and kneaded at a temperature of 240° C. to form nylon 6 pellets containing melamine.

By the same method, nylon 6 pellets containing cyanuric acid were prepared from 100 parts by weight of nylon 6 and 10 parts by weight of cyanuric acid. After drying at 80° C. in a vacuum dryer two kinds of the pellets obtained above were dry-blended in 50 parts by weight each and fed to an extruder having a diameter of 30 m/m, melted and kneaded. The molten blend was formed into white pellets (C) having a length of 3.0 m/m and a diameter of 3.0 m/m.

By the same method as in Example 1, these pellets were molded into a number of test specimens, and subjected to the tests. The results are summarized in Table 2.

For the comparative tests, 100 parts by weight of the above mentioned nylon 6 were blended with 10 parts by weight of an equimolar dry blended mixture of melamine and cyanuric acid by a Henschell mixer, then fed to an extruder having a diameter of 30 m/m. The blends are melted and kneaded to form pellets (D). Pellets (D) were shaped into test specimens and subjected to the tests in the same manner as described above. As understood from the data shown in Table 2, flame retardant and bleed out characteristics of the polyamide molding resin were unsatisfactory.

From the results of Table 2, it is clearly shown that the polyamide molding resin of this invention has satisfactory flame retarding and bleed out characteristics.

Further investigation of the x-ray diffraction analysis was carried out regarding the nylon 6 pellets (C) and (D). The x-ray diffraction charts are shown in FIG. 3 for the pellets (C) and FIG. 4 for (D) respectively. FIG. 4 shows that the pellets (D) still contain melamine (peak A) and cyanuric acid (peak B), whereas the pellets (C) only contain melamine cyanurate and melamine and cyanuric acid are completely converted to melamine cyanurate.

TABLE 2

| Specimen | L (Å) | UL-94 Flame Class | Bleed out of Flame Retardant | Tensile Strength (kg/cm$^2$) |
|---|---|---|---|---|
| C (this invention) | 150 | V-0 | o | 800 |
| D (comparative test) | 150 | V-2 | x | 775 |

EXAMPLE 3

The melamine/nylon 6 and cyanuric acid/nylon 6 pellets prepared in Example 2 and virgin pellets of nylon 6 as used in Example 2, were dry-blended and the ultimate composition of the blends are shown in Table 3. The composition thus obtained were tested by the same method as used in Example 2. The results are shown in Table 3.

TABLE 3

| No. | The amount of flame retardant (parts by weight per 100 parts of nylon 6) | | L (Å) | UL-94 flame Class | Bleed out of flame retardant | Tensile Strength (kg/cm$^2$) |
|---|---|---|---|---|---|---|
| | Melamine | Cyanuric acid | | | | |
| 1 | 1 | 1 | 140 | V-2 | 0 | 735 |
| 2 | 2 | 2 | 145 | V-0 | 0 | 750 |
| 3 | 3 | 3 | 145 | V-0 | 0 | 770 |
| 4 | 4 | 4 | 150 | V-0 | 0 | 770 |

EXAMPLE 4

Two extruders having a diameter of 30 m/m were installed so that the molten stream of nylon 6 coming out from the heads of both extruders were joined together in a static mixer tube (TORAY "High Mixer"), thoroughly melt-blended therethrough and extruder from the outlet of the mixer. To each hopper of the extruders in this equipment, the dry blends of melamine powder with nylon 6 pellets (15/85% by weight) and cyanuric acid powder with nylon 6 pellets (15/85% by weight) were fed respectively, and then melted and kneaded at a temperature of 250° C. The thoroughly blended nylon composition was extruded from the static mixer as a gut, which was cut into pellets.

Some test specimens were prepared from the pellets. The flame retarding properties of this blend were evaluated as UL-94 V-0, and no bleed out phenomenon was observed. This blend was found to have excellent mechanical properties. Tensile strength was 790 kg/cm$^2$. The crystal particle size of melamine cyanurate dispersed in nylon 6 was 180 Å.

EXAMPLE 5

100 parts by weight of nylon 6, having the relative viscosity of 2.35 and 5 parts by weight of melamine were fed into an extruder having a diameter of 30 m/m, and shaped into pellets (melted and kneaded at 245° C.). 4.76 parts of cyanuric acid were added to 100 parts of the above-obtained pellets, then mixed and fed to an extruder having an inside diameter of 30 m/m, and shaped to cylindrical pellets (E) of 3.0 m/m in diameter and 3.0 m/m in length.

Other pellets (F) were obtained by the same operation by adding melamine to previously prepared nylon/cyanuric acid blends.

For the comparative test, 100 parts of nylon 6 and 10 parts of a pre-mixed equimolar mixture of melamine and cyanuric acid were uniformly blended in a Henschell-Mixer, then fed to an extruder having a diameter of 30 m/m, melted and kneaded to the pellets (G) of 3.0 m/m in diameter, 3.0 m/m in length.

These pellets (E)–(G) were molded to the test specimens and subjected to the tests of the measurement of L, flammability and tensile strength. The results are shown in Table 4.

Further, the results of the x-ray diffraction analysis of the test specimens of (E), (G) shows only the peak of melamine cyanurate and no peak of melamine and cyanuric acid.

TABLE 4

| Source of Pellet | $L$ (Å) | UL-94 Flame Class | Bleed out of flame retardant | Tensile Strength (kg/cm²) |
|---|---|---|---|---|
| (E) | 150 | V-0 | o | 810 |
| (F) | 155 | V-0 | o | 790 |
| (G) | 155 | V-0 | x | 760 |

EXAMPLE 6

60 parts of nylon 6 having a relative viscosity ($\eta_r$) of 2.70, and 40 parts of melamine were uniformly blended by a Henschell mixer, and fed to an extruder, having a diameter of 60 m/m, and thoroughly melt-blended at a temperature of 260° C. This mixture was then shaped into nylon 6 master pellets containing 40% of malamine.

The above nylon 6 master pellets containing melamine, cyanuric acid and pellets of nylon 6 having $\eta_r$ of 2.35 were dry-blended at the final composition shown in Table 5 by the V-type blender. The mixture was fed to a vent type extruder, melt-blended at a temperature of 260° C. and then pelletized to white pellets containing melamine cyanurate. These pellets were molded in to a number of test specimens and subjected to the measurement of (L) and flammability and mechanical properties by the method similar to Example 1.

For the comparative tests, the nylon 6 master pellets containing 40% of melamine cyanurate were prepared from the nylon 6 having $\eta_r$ of 2.70 and malamine cyanurate powder. The master pellets were diluted by melt-blending the same with nylon 6 pellets and pelletized. The blends thus obtained were subjected to the same test by the same method. The results were shown in Table 5.

Further, from the x-ray diffraction analysis of the test specimen of 6-1–6—6, no peaks of melamine and cyanuric acid were observed and instead of only the peak of melamine cyanurate was observed.

TABLE 5

| | The amount of blend (%) | | | | | | | |
|---|---|---|---|---|---|---|---|---|
| | Melamine | cyanuric acid | $L$ (Å) | Flammability | | | | Tensile Strength (kg/cm²) |
| example 6-1 | 2 | 2 | 140 | 1 (o) | 0 (o) | 1 (o) | 0 (o) | 1 (o) | 840 |
| example 6-2 | 3 | 3 | 140 | 0 (o) | 0 (o) | 0 (o) | 0 (o) | 0 (o) | 850 |
| example 6-3 | 5 | 5 | 150 | 0 (o) | 0 (o) | 0 (o) | 0 (o) | 0 (o) | 870 |
| example 6-4 | 7 | 7 | 150 | 0 (o) | 0 (o) | 0 (o) | 0 (o) | 0 (o) | 850 |
| example 6-5 | 10 | 10 | 170 | 0 (o) | 0 (o) | 0 (o) | 0 (o) | 0 (o) | 880 |
| example 6-6 | 15 | 15 | 190 | 0 (o) | 0 (o) | 0 (o) | 0 (o) | 0 (o) | 890 |
| | melamine | cyanurate | | | | | | | |
| comparative example 6-1 | " | 4 | 300 | 3 (x) | 1 (x) | 0 (x) | 3 (o) | 0 (x) | 810 |
| comparative example 6-2 | " | 6 | 300 | 2 (x) | 0 (o) | 0 (o) | 2 (x) | 2 (o) | 820 |
| comparative example 6-3 | " | 10 | 320 | 2 (o) | 2 (o) | 0 (o) | 1 (o) | 1 (o) | 760 |
| comparative example 6-4 | " | 14 | 350 | 0 (o) | 0 (o) | 0 (o) | 0 (o) | 0 (o) | 630 |
| comparative example 6-5 | " | 20 | 400 | 0 (o) | 0 (o) | 0 (o) | 0 (o) | 0 (o) | 520 |

EXAMPLE 7

A vent type screw extruder having a screw diameter of 85 m/m and a cylinder length of 3.0 m, equipped with two feeding inlets is used. The first inlet resides at 2.5 m, and the second at 1 m from the exit of the extruder. Nylon 6 pellets and melamine were fed to the first feeding inlet and cyanuric acid was fed to the second feeding inlet continuously at a rate as shown in Table 6.

The melt blend was extruded from the exit at a temperature of 260° C. in the form of a strand, and the strand was cooled in water and cut to form pellets 2.5 m/m in diameter and 2.5 m/m in length. The feeding machines used were the vibrating feeder (SHINO DENKI) and Funken Auto Feeder (Funken) respectively.

The pellets were molded in to test specimens and subjected to the tests in the similar way of Example 1. The results were summarized in Table 6.

No. 5 and 6 in the Table show the comparative examples using only nylon 6 at the first, and the equimolar mixture of melamine and cyanuric acid at the second feeding inlet.

TABLE 6

| | Feeding rate (kg/hr) | | | | | | Mechanical |
|---|---|---|---|---|---|---|---|
| | Inlet 1 | | Inlet 2 | $L$ (Å) | UL-94 flame class | Bleed out of flame ratardant | Tensile Strength (kg/cm) |
| | Nylon 6 | Melamine | Cyanuric acid | | | | |
| 1 | 200 | 2 | 2 | 140 | V-2 | o | 700 |
| 2 | 200 | 15 | 15 | 140 | V-0 | o | 820 |
| 3 | 200 | 25 | 25 | 140 | V-0 | o | 800 |

TABLE 6-continued

| | Feeding rate (kg/hr) | | | | UL-94 | Bleed out | Mechanical Tensile |
|---|---|---|---|---|---|---|---|
| | Inlet 1 | | Inlet 2 Cyanuric | L | flame | of flame | Strength |
| | Nylon 6 | Melamine | acid | (Å) | class | ratardant | (kg/cm) |
| 4 | 200 | 30 | 30 | 140 | V-0 | o | 760 |
| 5 | 200 | — | 6* | 150 | V-2 | x | 710 |
| 6 | 200 | — | 10* | 150 | V-0 | x | 770 |

*equimolar mixture of melamine and cyanuric acid

EXAMPLE 8

100 parts by weight (at dry base) of the wet pellets of nylon 6, polymerized by a conventional method and extracted with water to remove oligomers, was prepared. The nylon 6 had a relative viscosity of 2.20 in JIS-K-6810 and a water content of 10.3%. 100 parts by weight (at dry base) of the wet pellets were uniformly blended with the equimolar mixture of melamine and cyanuric acid powder by a Henschell mixer in the amount as shown in Table 7. The blends were fed into a vent type extrudure having an inside diameter of 65 m/m, then melt-blended at a temperature of 250° C. The melt blend was extruded in the form of a gut, which was cooled in a water bath and cut to form pellets. This melt-blend operation was easily and smoothly carried out.

The above-described pellets were dryed in a vacuum at a temperature of 90° C. for 15 hours, then molded to a number of test specimens at a temperature of 245° C. and subjected to measurements.

On the other hand, the above-mentioned nylon 6 wet pellets were dryed to a content of below 0.1% of water. Then for the comparative tests, the above mentioned melt blending operation with a mixture of melamine and cyanuric acid was conducted in the absence of water, using the dryed pellets of nylon 6.

The test results were shown in Table 7.

From the Table 7, it is clear that the polyamide melt-blended with the equimolar mixture of melamine and cyanuric acid in an presence of water gives the improved flame retarding polyamide in flame retarding and bleed out characteristics.

By the x-ray diffraction analysis of the UL-test specimen in 1/16 inch thickness of samples 1 to 3, it was confirmed that melamine and cyanuric acid were completely converted to melamine cyanurate, whereas the samples of the comparative example were found to contain melamine and cyanuric acid together with melamine cyanurate.

TABLE 7

| No. | | Nylon 6 | The amount of equimolar mixture of melamine and cyanuric acid (parts) | L (Å) | UL-94 flame class | Bleed out of flame retardant | Tensile Strength (kg/cm²) |
|---|---|---|---|---|---|---|---|
| 1 | (example) | water-containing pellets | 6 | 170 | V-0 | o | 760 |
| 2 | (example) | water-containing pellets | 10 | 180 | V-0 | o | 780 |
| 3 | (example) | water-containing pellets | 15 | 180 | V-0 | o | 750 |
| 4 | (comparative example) | dried pellets | 6 | 170 | V-2 | x | 720 |
| 5 | (comparative example) | dried pellets | 10 | 180 | V-0 | x | 730 |
| 6 | (comparative example) | dried pellets | 15 | 200 | V-0 | x | 710 |

EXAMPLE 9

100 parts of nylon 6, having a $\eta_r$ of 2.70, and the equimolar premixed mixture of melamine and cyanuric acid and water in the amount shown in Table 8, were uniformly blended by a Henschell mixer, and then fed to a twin screw extruder named TEM 50 produced by TOSHIBA KIKAI CO. LTD. melt-blended at a temperature of 270° C., extruded to a gut and cut to form pellets. After drying these pellets at 80° C. for 16 hours in a vacuum, the test specimens were shaped and subjected to the tests in the same way as described in example 1.

The results are summarized in Table 8.

Further, by the x-ray diffraction analysis of each test specimen, the peaks of melamine and cyanuric acid were not observed and only the peak of melamine cyanurate shown by the samples 9-2–9-9 in Table 8. But in sample 9-1, the peaks of melamine cyanurate, melamine and cyanuric acid were observed.

TABLE 8

| | Amount added (%) | | | | | | | | Tensile | Izod Impact |
|---|---|---|---|---|---|---|---|---|---|---|
| No. | Equimolar mixture of melamine and cyanuric acid | Water | L (Å) | Flammability | | | | | Strength (kg/cm²) | Strength (kg cm/cm) |
| 9-1 | 7 | 0 | 160 | 3 | 1 | 3 | 2 | 0 | 810 | 4.0 |

TABLE 8-continued

| No. | Amount added (%) Equimolar mixture of melamine and cyanuric acid | Water | L (Å) | Flammability | | | | | Tensile Strength (kg/cm²) | Izod Impact Strength (kg cm/cm) |
|---|---|---|---|---|---|---|---|---|---|---|
| 9-2 | 7 | 1 | 150 | (x) 2 | (o) 1 | (x) 1 | (o) 0 | (o) 2 | 830 | 4.5 |
| 9-3 | 7 | 5 | 140 | (o) 1 | (o) 0 | (o) 0 | (o) 0 | (o) 1 | 850 | 4.6 |
| 9-4 | 15 | 5 | 150 | (o) 0 | (o) 0 | (o) 0 | (o) 0 | (o) 0 | 870 | 4.3 |
| 9-5 | 15 | 10 | 150 | (o) 0 | (o) 0 | (o) 0 | (o) 0 | (o) 0 | 870 | 4.3 |
| 9-6 | 15 | 15 | 150 | (o) 0 | (o) 0 | (o) 0 | (o) 0 | (o) 0 | 870 | 4.2 |
| 9-7 | 30 | 15 | 200 | (o) 0 | (o) 0 | (o) 0 | (o) 0 | (o) 0 | 880 | 4.0 |
| 9-8 | 30 | 30 | 250 | (o) 0 | (o) 0 | (o) 0 | (o) 0 | (o) 0 | 880 | 4.0 |
| 9-9*1 | 35 | 30 | 250 | (o) 0 (o) | (o) 0 (o) | (o) 0 (o) | (o) 0 (o) | (o) 0 (o) | 870 | 4.0 |

*1 difficult to withdraw the gut because of foaming

What we claim is:

1. A flame retardant polyamide molding resin which comprises a polyamide and melamine cyanurate finely dispersed therein, and said melamine cyanurate having an average crystallite size (L) of less than 250 Å, as determined by x-ray diffraction analysis of the polyamide molding resin calculated according to the following formula:

$$L = \frac{\kappa \cdot \lambda}{\beta_o \cdot \cos \theta}$$

wherein L is the average crystallite size of melamine cyanurate measured along the direction perpendicular to the lattice planes whose spacing is 3.17 Å, $\theta$ is the diffraction angle of lattice planes whose spacing is 3.17 Å, $\beta_o$ is the half width of the diffraction peak corresponding to the lattice planes whose spacing is 3.17 Å in radian, $\kappa$ is the constant 1.0 and $\lambda$ is the wavelength of the employed x-ray in Å.

2. A flame retardant polyamide molding resin according to claim 1, wherein the average crystallite size (L) is less than 200 Å.

3. A flame retardant polyamide molding resin according to claim 1, wherein the amount of melamine cyanurate is 1 to 30% by weight based on the molding resin.

4. A flame retardant polyamide molding resin according to claim 1, wherein the amount of melamine cyanurate is 3 to 15% by weight based on the molding resin.

5. A flame retardant polyamide molding resin according to claim 1, wherein the polyamide is nylon 6.

6. A flame retardant polyamide molding resin according to claim 1, wherein the polyamide is nylon 6/66 copolyamide.

7. The flame retardant polyamide molding resin defined in claim 1, which contains substantially no free melamine or cyanuric acid.

8. The flame retardant polyamide molding resin defined in claim 1, wherein the melamine cyanurate is formed from equimolar amounts of melamine and cyanuric acid at a conversion of substantially 100%.

* * * * *

UNITED STATES PATENT AND TRADEMARK OFFICE
CERTIFICATE OF CORRECTION

PATENT NO. : 4,321,189
DATED : March 23, 1982
INVENTOR(S) : Hiroshi Ohshita et al It is certified that error appears in the above-identified patent and that said Letters Patent are hereby corrected as shown below:

Column 3, line 67, after "reaction" delete "can not" and insert --cannot--
Column 4, line 38, after "same" delete "in to" and insert --into--
Column 5, line 11, after "in" delete "this" and insert --these--
line 46, after "within" delete "an" and insert --the--
after "of" delete "the" and insert --an--
Column 6, line 29, after "by" delete "a"
line 30, after "by" insert --a--
line 40, after "having" delete "a" and insert --an--
line 59, after "x-ray" delete "diffration" and insert --diffraction--
Column 7, line 11, after "are" delete "summerized" and insert --summarized--
Column 9, line 24, Table 4, under heading "Bleed out of flame retardant" delete "kg/cm$^2$" and insert same under "Tensile Strength"
line 43, after "molded" delete "in to" and insert --into--
line 56, after "of" delete "6-1-6-6" and insert --6-1 -- 6-6--

UNITED STATES PATENT AND TRADEMARK OFFICE
CERTIFICATE OF CORRECTION

PATENT NO. : 4,321,189
DATED : March 23, 1982
INVENTOR(S) : Hiroshi Ohshita et al It is certified that error appears in the above-identified patent and that said Letters Patent are hereby corrected as shown below:

Column 10, line 1, after "instead" delete "of"
            line 53, after "molded" delete "in to" and insert --into--
Column 11, line 44, after "type" delete "extrudure" and insert --extruder--
            line 50, after "were" delete "dryed" and insert --dried--
            line 55, after "were" delete "dryed" and insert --dried--
            line 59, after "the" delete "dryed" and insert --dried--
Column 12, line 12, after "in" delete "an" and insert --the--
            line 60, after "samples" delete "9-2-9-9" and insert --9-2 -- 9-9--

Signed and Sealed this

First Day of June 1982

[SEAL]

Attest:

GERALD J. MOSSINGHOFF

Attesting Officer     Commissioner of Patents and Trademarks